May 10, 1932. C. CONE 1,857,806
GLASS FORMING APPARATUS AND PROCESS
Filed July 29, 1929 2 Sheets-Sheet 1
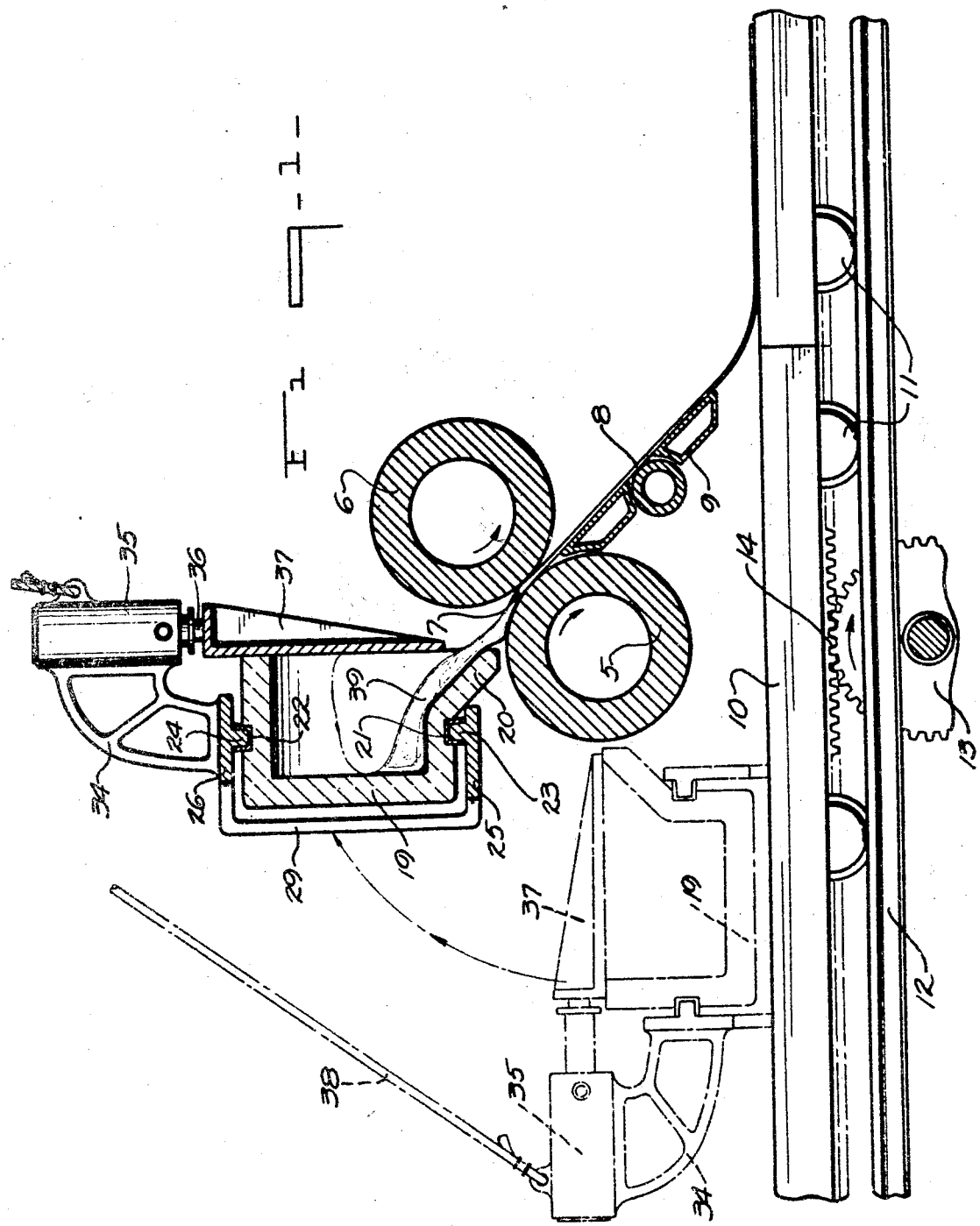
Inventor
Carroll Cone
By Frank Fraser
Attorney

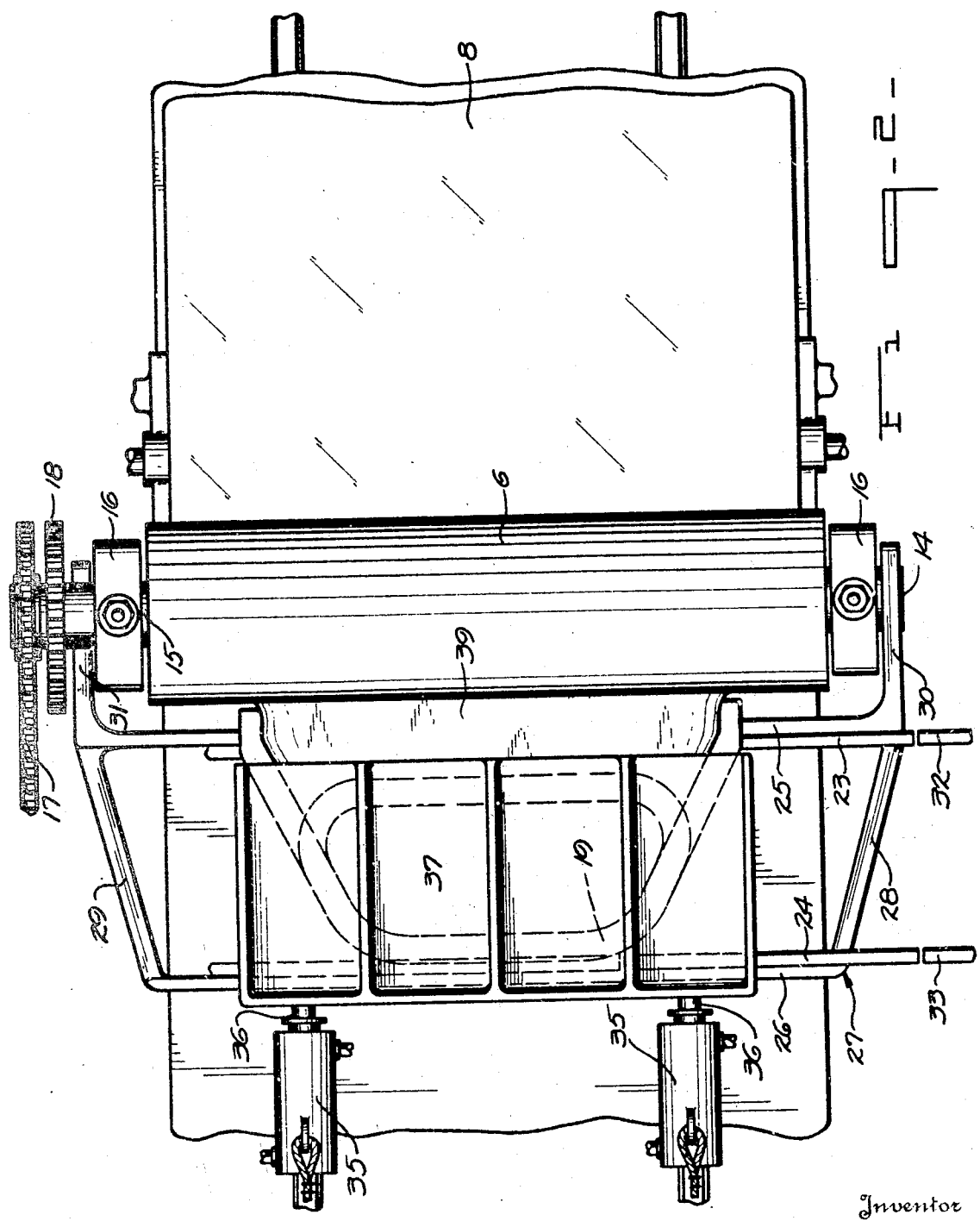

Patented May 10, 1932

1,857,806

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

GLASS FORMING APPARATUS AND PROCESS

Application filed July 29, 1929. Serial No. 381,747.

The present invention relates to a process and apparatus for the production of sheet or plate glass.

According to one process commercially used in the manufacture of sheet glass, a relatively large charge or pour of molten glass is flowed from a receptacle or pot and deposited en masse upon a substantially horizontally arranged receiver or slab, said receiver or slab being subsequently tilted in a manner to cause the glass to flow therefrom between a pair of forming rolls, the glass being reduced by said rolls to a sheet of substantially predetermined and uniform thickness. In such process, it has been found that the glass will flow from the receiver in a relatively narrow stream first between the centers of the forming rolls and will then gradually be spread transversely by said rolls throughout substantially the length thereof.

With such an arrangement, the head or initial portion of the sheet formed will be relatively narrow with the said sheet becoming gradually wider until it attains its maximum net width. The relatively narrow head portion of the sheet first formed must then be removed or cut from the main body thereof since it is not commercially usable, and this naturally involves considerable waste and furthermore results in the reduction of the size of sheet produced. Furthermore, in the past, the molten glass has been caused to bank up against the forming rolls at substantially the centers thereof and since the glass is then spread laterally thereby, it has resulted in the glass contacting with the rolls for an undue length of time before being reduced to sheet form causing an undesirable chilling thereof. In addition, the lateral spreading of the molten glass by the forming rolls agitates the glass to an undesirable extent and causes an overlapping of the glass and the entrapping of air therein which results in the creation of defects in the finished product.

The general object of the invention is to avoid the above objectionable features incident to the operation of the process described, by providing an improved process and apparatus for delivering the molten glass to the forming rolls in a more efficient and practical manner than heretofore and in such a manner that the quality of the glass and the temperature thereof will not be adversely affected during such delivery.

Another object of the invention resides in the provision of such a process and apparatus wherein the glass sheet produced will be brought more quickly to its desired net width with the result that the amount of glass which must be trimmed or cut from the head or initial portion of the sheet formed will be minimized so that the amount of waste is materially reduced and the length of sheet formed from a given quantity of molten glass correspondingly increased.

Another object of the invention resides in the provision of apparatus for delivering the molten glass to the forming rolls throughout substantially the entire length thereof simultaneously in a controlled stream to the end that the glass will not bank up against the rolls nor will the spreading of the glass be dependent upon the action of the rolls with the result that the glass will not contact with the forming rolls an undue length of time and will therefore not be unduly chilled before being reduced to sheet form.

A further object of the invention resides in the provision of novel apparatus for supplying the molten glass to the forming rolls including a receptacle or pot, means for movably supporting the pot, and means associated with said pot for controlling the flow of molten glass therefrom.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through apparatus constructed in accordance with the present invention, and Fig. 2 is a partial plan and a partial front elevation thereof with the pot or receptacle in its raised position as indicated by the full lines in Fig. 1.

Referring to the drawings, there is illustrated a sheet forming mechanism including a pair of forming rolls 5 and 6, spaced from one another to create a sheet forming pass 7 therebetween. The molten glass supplied to these rolls is reduced thereby to a sheet 8 of substantially predetermined and uniform thickness, said sheet passing downwardly from the forming rolls over an inclined runway or apron 9 onto one or a plurality of cars or carriers 10. These cars or carriers, may be mounted upon wheels 11 which roll along a trackway 12 and may be driven from the drive pinion 13 secured to the undersides thereof. The forming rolls 5 and 6 are carried by shafts 14 and 15 respectively, journaled at their opposite ends in fixed bearing brackets 16. One of the forming rolls is adapted to be positively driven such as through a chain drive 17 and the other roll is driven from the positively driven roll through intermeshing gears 18 carried by the shafts 14 and 15 of said rolls.

The novel means herein provided for delivering the molten glass to the forming rolls comprises a substantially oval shaped refractory pot or receptacle 19 having a dumping or overflow 20 at one side thereof. Carried at the front and rear sides of the pot 19 are the outwardly facing channel members 21 and 22 adapted to engage and slide upon the rail portions 23 and 24 formed on the spaced longitudinally extending parallel side members 25 and 26 of the pot supporting frame designated in its entirety by the numeral 27. The side members 25 and 26 of the supporting frame 27 are connected at their opposite ends by the substantialy U-shaped end members 28 and 29. Arranged at the opposite ends of the supporting frame 27 are the forwardly directed arms 30 and 31 pivotally mounted at their outer ends upon the opposite end portions of the shaft 14 for the lower forming roll 5 so that said supporting frame and pot 19 carried thereby can be swung in a vertical arc about the axis of the lower forming roll. The numerals 32 and 33 designate a pair of guide rails which are adapted to align with the rail portions 23 and 24 on the supporting frame 27 when said frame is in its lowered position.

Secured to the side member 26 of the supporting frame 27 is a pair of spaced brackets 34, each carrying a cylinder 35 within which operates a plunger 36, said plungers carrying at their outer ends a controlling gate or plate 37 preferably formed of some suitable noncorrosive alloy such as nichrome, Monel or the like. The gate 37 is adapted to extend over and form a covering or closure for the outlet of the pot or receptacle 19 so as to control the flow of molten glass therefrom.

In carrying the invention into practice, the pot 19 having first been filled with completely melted and refined molten glass is then run along the rails 32 and 33 and onto the rail portions 23 and 24 of the supporting frame. This sliding movement of the pot is effected due to the sliding engagement of the channel members 21 and 22 with the rails 32 and 33 and rail portions 23 and 24. During the placing of the pot in position upon the supporting frame 27, the said frame will of course be in a substantially horizontal position as indicated by the broken lines in Fig. 1. When the pot is properly positioned upon the supporting frame, the plungers 36 are operated within cylinders 35 to actuate the gate 37 in a manner to completely cover the pot outlet as also indicated by the broken lines in Fig. 1. By means of a plurality of cables or the like 38, the supporting frame 27 and pot 19 can then be swung upwardly through a vertical arc about the shaft 14 of the lower forming roll 5 to the position indicated by the full lines in Fig. 1, and during such movement the gate 37 will prevent any of the molten glass from flowing from the pot. The gate 37 is then adapted to be raised the desired amount to permit the molten glass 39 to flow from the pot to the forming rolls. When the gate is raised, it will be apparent that the molten glass will flow from the pot to the forming rolls throughout substantially the length thereof simultaneously, and by properly manipulating the gate 37, the molten glass can be caused to flow from the pot in a relatively thin, wide stream so that it will be reduced to sheet form almost as soon as it contacts with the forming rolls. Thus, none of the molten glass will be permitted to flow from the receptacle 19 until said receptacle has reached its full or complete discharge position.

By proper adjustment of the gate 37, the flow of glass from the pot can be accurately controlled. Since the glass is supplied to the forming rolls throughout substantially the length thereof simultaneously, the sheet formed will be more rapidly brought to its maximum net width so that the amount of glass which must be trimmed from the forward end of the sheet will be minimized and the amount of waste clearly reduced with the length of sheet correspondingly increased. Also, the spreading of the glass laterally is not dependent upon the action of the forming rolls with the result that the glass will not be unduly chilled before being reduced to sheet form, nor will the quality thereof be impaired.

It is to be understood that the form of the invention herewith shown and described is to be taken as the preferred embodiment of the same, and that various changes in the specification and arrangement of parts may be resorted to without departing from the spirit of the invention or the scope of the subjoined claims.

I claim:

1. In sheet glass apparatus, the combination with sheet forming means, of a portable pot containing a charge of molten glass, means for removably supporting and moving said pot into a discharge position with respect to the sheet forming means, and a slidably mounted gate forming a closure for the outlet of the pot and movable with said pot for controlling the flow of molten glass therefrom.

2. In sheet glass apparatus, the combination with sheet forming means, of a portable pot containing a charge of molten glass, means for removably supporting and moving said pot into a discharge position with respect to the sheet forming means, means forming a closure for the outlet of the pot during the movement thereof into such discharge position, and means for actuating said last-named means to control the flow of glass from the pot.

3. In sheet glass apparatus, the combination with sheet forming means, of a portable pot containing a charge of molten glass, means for removably supporting and moving said pot into a discharge position with respect to the sheet forming means, a slidably mounted gate forming a closure for the outlet of the pot during the movement thereof into such discharge position, and means for actuating said gate to control the flow of molten glass from the pot.

4. In a sheet glass apparatus, the combination with sheet forming means, of a portable pot containing a charge of molten glass, means for removably supporting said pot, means for moving the supporting means and pot to bring said pot to a discharge position with respect to the sheet forming means, and means also carried by said supporting means and forming a closure for the outlet of the pot for controlling the flow of molten glass from said pot.

5. In sheet glass apparatus, the combination with sheet forming means, of a portable pot containing a charge of molten glass, means for removably supporting said pot, means for moving the supporting means and pot to bring said receptacle to a discharge position with respect to the forming means, a slidably mounted gate carried by the supporting means and forming a closure for the outlet of said pot, and means for actuating said gate to control the flow of molten glass from the pot.

6. In a sheet glass apparatus, the combination with sheet forming means, of a portable pot containing a charge of molten glass, a pivotally mounted frame for removably supporting said receptacle, means for moving the frame and pot to bring said pot to a discharge position with respect to the forming means, and a slidably mounted gate carried by the frame and forming a closure for the outlet of the pot for controlling the flow of molten glass from said pot.

7. In sheet glass apparatus, the combination with a pair of sheet forming rolls, of a portable pot containing a charge of molten glass, means for removably supporting said pot, means for mounting said supporting means to swing about the axis of rotation of one of said forming rolls to bring the pot to a discharge position with respect to said rolls, and means forming a closure for the outlet of the pot for controlling the flow of molten glass from said pot.

8. In sheet glass apparatus, the combination with a pair of sheet forming rolls, of a portable pot containing a charge of molten glass, means for removably supporting said pot, means for mounting said supporting means to swing about the axis of rotation of one of said forming rolls to bring the pot to a discharge position with respect to said rolls, and a slidably mounted gate carried by said supporing means and forming a closure for the outlet of the pot for controlling the flow of molten glass from said pot.

9. In sheet glass apparatus, the combination with a pair of substantially superimposed sheet forming rolls, of a supporting frame pivotally mounted to swing about the axis of rotation of the lower roll, rail portions carried by said frame, a portable pot containing a charge of molten glass and having means slidably engaging said rail portions, and means forming a closure for the outlet of the pot for controlling the flow of molten glass from said pot.

10. In sheet glass apparatus, the combination with a pair of substantially superimposed sheet forming rolls, of a supporting frame pivotally mounted to swing about the axis of rotation of the lower roll, rail portions carried by said frame, a portable pot containing a charge of molten glass and having means slidably engaging said rail portions, and a slidably mounted gate carried by the supporting frame and forming a closure for the outlet of the pot for controlling the flow of molten glass from said pot.

11. The process of delivering molten glass to a pair of sheet forming rolls, which consists in containing a charge of molten glass in a portable receptacle, moving the receptacle to a discharge position with respect to the forming rolls, and in providing a closure for the outlet of the receptacle to prevent the flow of any glass from said receptacle until it has reached its full discharge position.

12. The process of delivering molten glass to a pair of sheet forming rolls, which consists in containing a charge of molten glass in a portable receptacle, moving the receptacle to a discharge position with respect to the forming rolls, providing a closure for the outlet of the receptacle to prevent the flow of any glass from said receptacle until said receptacle has reached its full discharge position, and in then flowing the glass from the receptacle directly to the forming rolls throughout substantially the entire length thereof simultaneously.

Signed at Toledo, in the county of Lucas and State of Ohio, this 26th day of July, 1929.

CARROLL CONE.